United States Patent [19]
Shen et al.

[11] Patent Number: 6,061,438
[45] Date of Patent: May 9, 2000

[54] EXTENSION-IN-USE EXCLUSION APPARATUS

[75] Inventors: Francis N. Shen; Anthony P. Shen, both of Unionville; Grigor K. Kotzev, Toronto, all of Canada

[73] Assignee: Aastra Technologies Inc, North York, Canada

[21] Appl. No.: 08/262,614

[22] Filed: Jun. 20, 1994

[51] Int. Cl.[7] ................................................ H04M 1/72
[52] U.S. Cl. ........................ 379/161; 379/194; 379/199; 379/442
[58] Field of Search .................... 379/161, 442, 379/195, 156, 184, 194, 377, 382, 199

[56] References Cited

U.S. PATENT DOCUMENTS

| | | | |
|---|---|---|---|
| 4,218,590 | 8/1980 | Rasmussen et al. | 179/99 |
| 4,747,128 | 5/1988 | Chan et al. | 379/194 |
| 4,805,210 | 2/1989 | Griffith, Jr. | 379/195 |
| 4,809,317 | 2/1989 | Howe et al. | 379/98 |
| 4,817,137 | 3/1989 | Rosenfeld et al. | 379/381 |
| 4,825,465 | 4/1989 | Ryan | 379/399 |
| 4,899,372 | 2/1990 | Wahi et al. | 379/194 |
| 4,932,048 | 6/1990 | Kenmochi et al. | 379/67 |
| 4,987,586 | 1/1991 | Gross et al. | 379/93 |
| 4,995,073 | 2/1991 | Okata et al. | 379/94 |
| 5,003,581 | 3/1991 | Pittard | 379/93 |
| 5,014,299 | 5/1991 | Klupt et al. | 379/98 |
| 5,023,903 | 6/1991 | Bowen | 379/67 |
| 5,027,385 | 6/1991 | Nakagawa et al. | 379/100 |
| 5,036,534 | 7/1991 | Gural | 379/67 |
| 5,056,132 | 10/1991 | Coleman et al. | 379/95 |
| 5,056,133 | 10/1991 | Iida | 379/98 |
| 5,151,972 | 9/1992 | Lorenz et al. | 379/93 |
| 5,231,658 | 7/1993 | Eftechiou | 379/194 |
| 5,317,629 | 5/1994 | Watanabe | 379/93 |
| 5,444,772 | 8/1995 | Coker | 379/184 |

*Primary Examiner*—Scott Wolinsky
*Attorney, Agent, or Firm*—George C. Beck; Kilpatrick Stockton LLP

[57] ABSTRACT

An extension-in-use exclusion apparatus is for use in a telephone system. The system has a telephone device, a telephone line, and two telephone extensions connected to the line. The apparatus is connected between one extension and the telephone device. The apparatus has an exclusion controller connecting the line to the telephone device when all extensions other than the extension for the telephone device are on-hook and the telephone device extension is off-hook. The exclusion controller does not connect the line to the telephone device when another extension is off-hook and the telephone device is off-hook. A user operable switch can instruct the exclusion controller to connect the line to the telephone device when another extension is off-hook and the telephone device is off-hook. The apparatus automatically returns to exclusion mode when the telephone device returns to off-hook. A by-pass allows FSK signals to pass directly through to the telephone device. The apparatus has no polarity and is symmetrical.

20 Claims, 3 Drawing Sheets

EXTENSION-IN-USE EXCLUSION APPARATUS

FIELD OF THE INVENTION

The invention relates to devices to prevent interruption of a telephone call in progress by excluding telephone devices from the telephone line when a telephone extension is in use.

BACKGROUND OF THE INVENTION

The use of facsimile machines, modems and other data communication devices is becoming increasingly popular in homes and small businesses. In order to save on costs, this market often transmits data on the same telephone lines as it uses for voice communication. As well, telephone lines may be shared between groups of people or businesses. Although they are not required for outgoing calls, distinctive ringing services provided by telephone companies, operated under trademarks such as Ident-a-call™ of Bell Canada, have promoted the sharing of telephone lines in this manner.

Unfortunately, data transmissions are particularly sensitive to a telephone extension going off-hook or on-hook. Often the data transmission will fail. This is not only irritating, but can result in significant expense and delays in re-transmitting the data. This is especially true where an on-line service provider and long distance charges are involved.

A number of devices have been proposed for maintaining privacy in telephone systems. It is possible that they could be used to solve some of the above problems. For example, U.S. Pat. No. 4,809,317 issued to Howe et al on Feb. 28, 1989 for a Telephone Line Exclusion Device describes an exclusion device that interfaces between a single incoming telephone line and two extensions. If a telephone device on one of the two extensions goes off-hook then a relay in the exclusion device locks out the other extension. The Howe device still leaves a number of other problems. For example, the telephone devices that are capable of being excluded are always excluded when the other extension goes off-hook. This means that a call that is meant to be accessed by the excluded device cannot be accessed once another extension is in use. This prevents transferring of calls and conferencing calls between the excluded device and a telephone device on another extension, when the call does not commence on the excluded device.

Also, the exclusion device attaches to the incoming telephone line at the point where it branches into extensions. This means that an ordinary user would not likely be able to install the device. A service call would be required. As well, many modem telephone systems are not installed with extensions emanating from a single point. They are connected from a single cable run through the premises resulting in a ring configuration similar to some computer local area networks. As the Howe device must be connected where two or more extensions are accessible, it would generally be inappropriate for these installations.

Furthermore, the Howe device completely blocks all signals from reaching the excluded telephone device. This would prevent the excluded telephone device from accessing telecommunications features based on frequency shift keyed signals, such as call waiting name or number delivery provided under various trademarks, for example, the CLASS$^{SM}$ features of Bellcore.

U.S. Pat. No. 4,218,590 to Rasmussen et al on Aug. 19, 1980 for Key Telephone System having Automatic Exclusion Circuit For Line Privacy discloses a key telephone system passing incoming analog telephone lines through a control unit typically located in the user's home or office. The system redistributes access to the incoming lines to the user stations. A system such as Rasmussen can solve some of the conferencing and transfer issues, however it requires a complex key telephone system and otherwise suffers from the problems of Howe et al.

U.S. Pat. No. 4,805,210 issued to Griffith, Jr. on Feb. 14, 1989 entitled Automatic Telephone Line Sharing And Lockout Apparatus is an automatic lockout device for providing exclusive access to one of the telephone devices attached to the exclusion device. It takes a similar approach to Howe et al and suffers from similar problems.

U.S. Pat. No. 4,987,586 issued to Gross et al on Jan. 22, 1991 entitled Modem-Telephone Interconnect discloses an interface device for connecting a modem and a telephone to a telephone line. It allows either the modem or telephone to be connected to the line, but not both. It is conceptually similar to Howe et al and Griffith, Jr. and suffers from similar problems.

Some telephones have extension-in-use visual indicators. This solves many of the above problems, however a user may still accidentally pick up the phone without noticing the visual indication. Additionally, the visual indicator will typically require a power source, such as a battery or power adaptor. This means that the device could be quite bulky and impractical as a standalone unit.

There are exclusion devices available in the market, (or example Radio Shack fax/atad, Canadian Department of Communications approval number 255 2021A, that connect to an extension line and exclude other extensions, without having to be connected directly to the other extensions and the incoming line as in Howe et al. However these devices continue to prevent transfers and conference call, and block all signals to the excluded extension.

It is an object of the invention to address these or other problems with exclusion devices.

SUMMARY OF THE INVENTION

In a first aspect the invention provides an extension-in-use exclusion apparatus for use in a telephone system with at least one telephone device, a telephone line, and at least two telephone extensions connected to the line. The apparatus connects between an extension and a telephone device. It has an exclusion controller for connecting the line to the telephone device when the telephone device goes off-hook and all extensions other than the extension to which the apparatus is connected are on-hook. The exclusion controller does not connect the line to the telephone device when the telephone device goes off-hook and an extension other than the one to which the apparatus is connected is off-hook. A user operable control allows a user to connect the line to the telephone device when an extension other than the one to which the apparatus is connected is off-hook and the telephone device is off-hook.

The control may automatically not connect the line to the telephone device when the telephone device returns to on-hook. A detector may be used to detect if an extension is on-hook or off-hook and instruct the exclusion controller of the detected result.

A by-pass may connect the telephone line to the telephone device for the passage of desired signals from the line to the telephone device whether or not an extension and the telephone device are on-hook or off-hook. The impedance of the by-pass may be set to greater than the input impedance of the telephone device for communications intended to be heard directly by the user. The impedance may also be set lower than the input impedance of the telephone device for communications intended to drive communications other than those intended to be heard directly by the user. The by-pass may allow the passage of frequency shift keyed signals and have a parallel connected resistor of approximately 100 K-ohms and capacitor in the range of approximately 10 to 100 nano-farads.

The apparatus can be designed to allow for the use of power from the telephone line.

In a second aspect the invention provides an extension-in-use exclusion apparatus for use in a telephone system with telephone device, a telephone line having two sides, and two telephone extensions connected to the line. The apparatus provides a connection between a first extension and the one telephone device, It has a triac for connection between one side of the line and the telephone device. The triac has a control input for receiving signals, and is for connecting and not connecting the side of the line to the telephone device according to the signals received at the control input. A detector determines when all extensions other than the first extension are on-hook and when an extension other than the first extension is off-hook, and signals the control input of the triac accordingly. A user operable by-pass control signals the control input of the triac to connect the line to the telephone device when the telephone device is off-hook and an extension other than the first extension is off-hook.

The detector may employ a pair of back to back zener diodes for connecting to the side of the line and the control input, while the by-pass control can employ a momentary switch for connection to the side of the line, and the control input.

A resistor and capacitor can be connected in parallel across the triac for allowing the passage of desired signals from the line to the telephone device whether or not an extension and the telephone device are on-hook or off-hook. There may be a protection resistor for the diodes and the by-pass control. The apparatus may again be powered from the telephone line.

In a third aspect the invention provides a telephone system including the telephone line, extensions, the telephone device and the apparatus in each of the configurations described previously.

In a fourth aspect the invention provides a method of excluding at least one telephone device in the above telephone systems by the steps of connecting the line to the telephone device when the telephone device goes off-hook and all extensions other than the extension to which the apparatus is connected are on-hook, and not connecting the line to the telephone device when the telephone device goes off-hook and an extension other than the one to which the apparatus is connected is off-hook, and user activating a connection of the line to the telephone device when the telephone device is off-hook and an extension other than the one to which the apparatus is connected is off-hook.

In a filth aspect the invention provides an extension-in-use exclusion apparatus for use in a telephone system with at least one telephone device, a telephone line, and at least two telephone extensions connected to the line. The apparatus is for connection between one extension and the telephone device and has an exclusion controller for not connecting the line to the telephone device when the telephone device goes off-hook, and a user operable control for connecting the line to the telephone device when the telephone device is off-hook.

The apparatus in any of its aspects or configurations can be designed not to be affected by the polarity of the line, and can be designed to be symmetrical for interchanging its connections to the line and the telephone device without affecting the operation of the apparatus.

BRIEF DESCRIPTION OF THE DRAWINGS

For a better understanding of the present invention and to show more clearly how it may be carried into effect, reference will now be made, by way of example, to the accompanying drawing which show the preferred embodiment of the present invention and in which.

DETAILED DESCRIPTION OF THE PREFERRED EMBODIMENT

Figure 1:
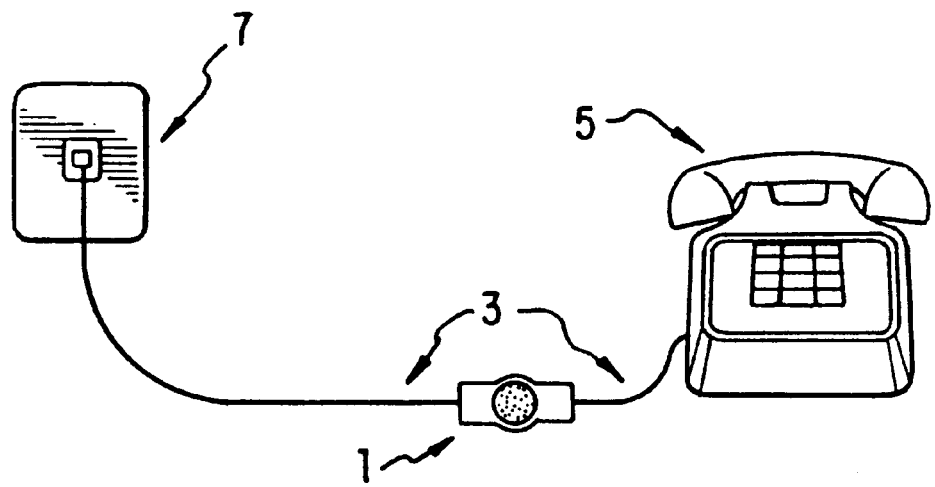
FIG. 1 is a diagrammatic sketch of an extension-in-use exclusion apparatus according to the preferred embodiment of the present invention connected between a wall jack and a telephone.

Referring to FIG. 1, an extension-in-use exclusion apparatus 1 is connected by standard telephone cable 3 to a telephone device 5 and a wall jack 7. Behind the wall jack 7, it is connected directly or indirectly to a telephone line, shown in FIG. 2.

For the purposes of this discussion, extensions are parallel branches from one telephone line. Telephone line is used in a very broad sense. The telephone line need not be directly connected to the telephone network as would typically be the arrangement in a house, but could be a telephone line from a private branch exchange (PBX) that is itself connected to multiple lines on the telephone network. The telephone line could even be at the wall jack 7, so that one telephone device, not shown, connected to the wall jack 7 could exclude another telephone device, not shown, also connected to the wall jack 7. A duplex connector, not shown, from the wall jack 7 might be required. In this case, the lines from the duplex connector would be extensions, and could even be thought of extensions of extensions with the wall jack itself being an extension of other telephone lines.

The telephone device 5 is shown as a standard telephone 5, however it could be another telephone device 5, such as a facsimile or modem or a combination of telephone devices, not shown.

Figure 2:
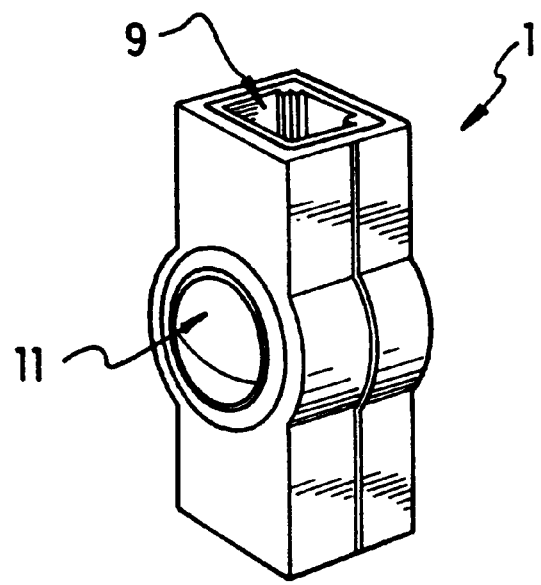
FIG. 2 is a perspective view of the apparatus of FIG. 1.

Referring to FIG. 2, the apparatus 1 has opposing RJ 11 female connectors 9, only one of which is evident in FIG. 2. The connectors 9 are for receiving corresponding male connectors, not shown, on the end of the cables 3 from the telephone device 5 and the wall jack 7. The apparatus 1 also has a switch 11 with a push button.

The outside contour of the apparatus 1 flows from a rectangular shape around the connectors 9 to a circle shape around the switch 11. The preferred embodiment was approximately 2" long, and ¾" by ¾" around the connectors 9. The small size of the apparatus 1 allows it to be mounted in-line with a telephone cable 3 hanging from a wall-mounted telephone 5, placed beside a table mounted telephone 5, or actually mounted to the telephone 5 with adhesive or the like. This small size is a result of low power circuitry in the apparatus 1 that allows it to be powered from the telephone line, rather than an external battery or adaptor, not shown, although this is still a possibility in cases where additional line load is undesirable.

Figure 3:
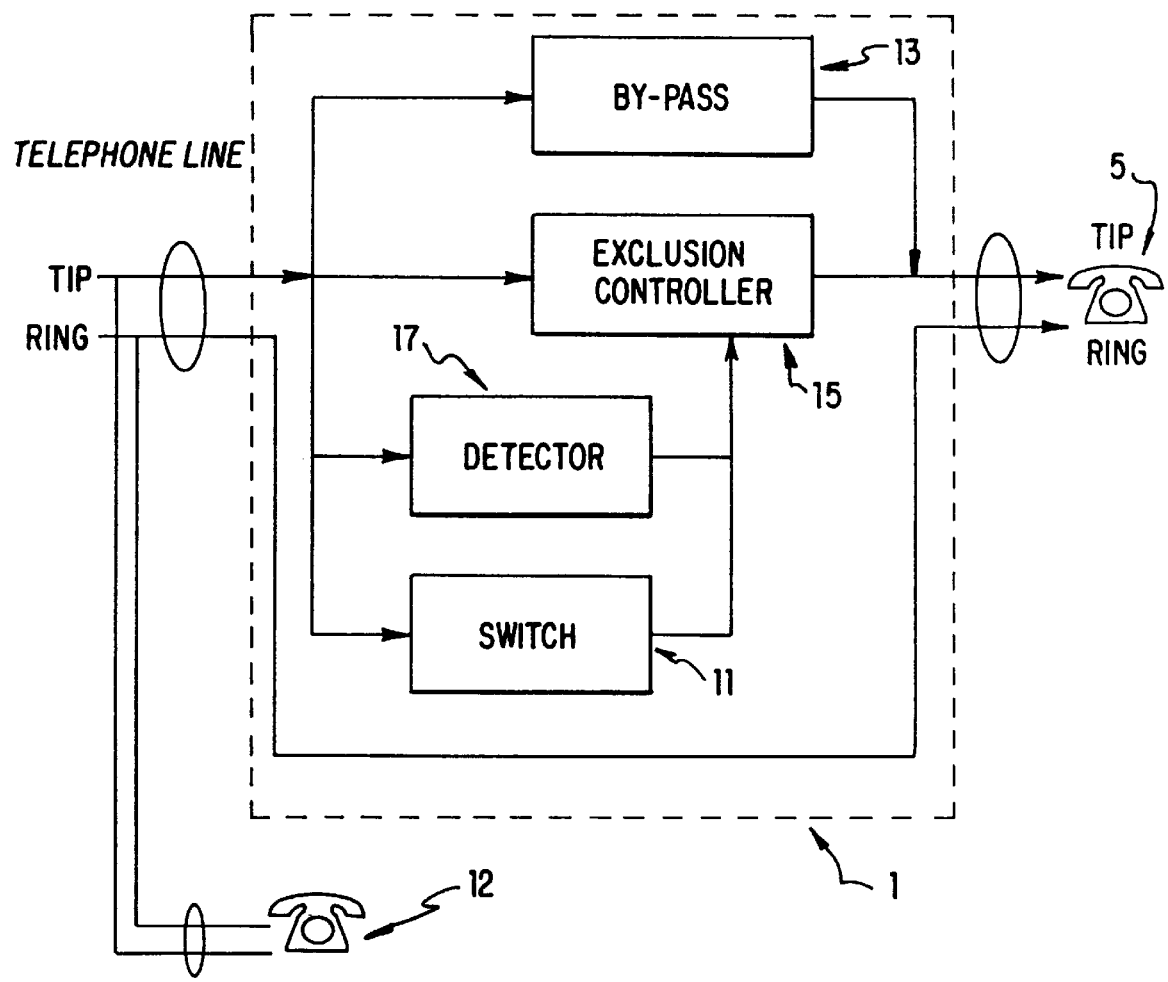
FIG. 3 is a block diagram of the apparatus of FIG. 1 connected in a telephone system.

Referring to FIG. 3, a telephone line has two sides, referred to as Tip and Ring, which are necessary to permit the operation of telephone devices such as telephone 5, or other telephone devices such as a facsimile machine or modem, not shown. The Tip and Ring sides are characterized by the DC bias that sets one to positive and the other to negative. The apparatus 1 is insensitive to this polarity. Although this description refers to the Ring side being connected in one structure and the Tip in another, the connections could be reversed.

As an example configuration, telephone 5 is connected to the telephone line through the apparatus 1, outlined in dashed lines, and the wall jack 7 of FIG. 1, while another telephone 12 is also connected to the telephone line. This simple implementation illustrates how the apparatus 1 would be placed when telephone 5 is the telephone that is to be excluded when another extension is in use. Other configurations are possible, for example, an additional apparatus 1 could be placed between the telephone 12 and the telephone line if telephone 12 is not to interrupt other extensions. Additional telephone devices, not shown, and apparatuses 1 could be added to the telephone line as required and permitted by the load factor on the telephone line.

In the apparatus 1, the Ring side is connected directly from one connector 9A to the other 9B, and thus passed directly from the telephone line to the connected telephone device 5. The Tip side is connected from the connector 9A to a by-pass for FSK signals 13, to an exclusion controller 15, to an off-hook detector 17, and to the switch 11. The detector 17 and the switch 11 are each connected to the controller 15. The by-pass 13 and controller 15 are connected to the connector 9B, and in turn to the Tip side of the telephone device 5.

In operation, the connection of the Tip side is controlled by the controller 15, detector 17 and switch 11, except for FSK signals that are by-passed by the by-pass 13. The controller 15 is normally in an exclusion mode preventing the connection of the Tip side to the telephone 5. If an extension, such as telephone 12, goes off-hook then the controller 15 will remain in exclusion mode.

The mode of the controller can be changed by either the detector 17 or the switch 11.

If no other extension is in use, the detector 17 detects a drop in voltage, usually from 48 to 5 VDC, when the telephone 5 goes off-hook. The detector 17 then signals the controller 15 to go into a non-exclusion mode allowing connection of the Tip side from the telephone line to the telephone 5. However, if another extension is in use, there will not be a drop in voltage as the voltage will have already dropped when the other extension went off-hook, and the controller 15 will remain in the exclusion mode. Thus, if all extensions are on-hook and telephone 5 goes off-hook then the Tip side is connected to the telephone 5 through the controller 15 due to the detector 17.

A user can manually put the exclusion apparatus 1 into a non-exclusion mode, to instruct the controller 15 to allow connection of the Tip side from the telephone line to the telephone 5, by taking the telephone 5 off-hook and pressing the switch 11. This allows the telephone 5 to access the telephone line. Upon the return of the telephone 5 to the on-hook state, the controller 15 returns to the exclusion mode awaiting signals from the detector 17 or switch 11.

Figure 4:
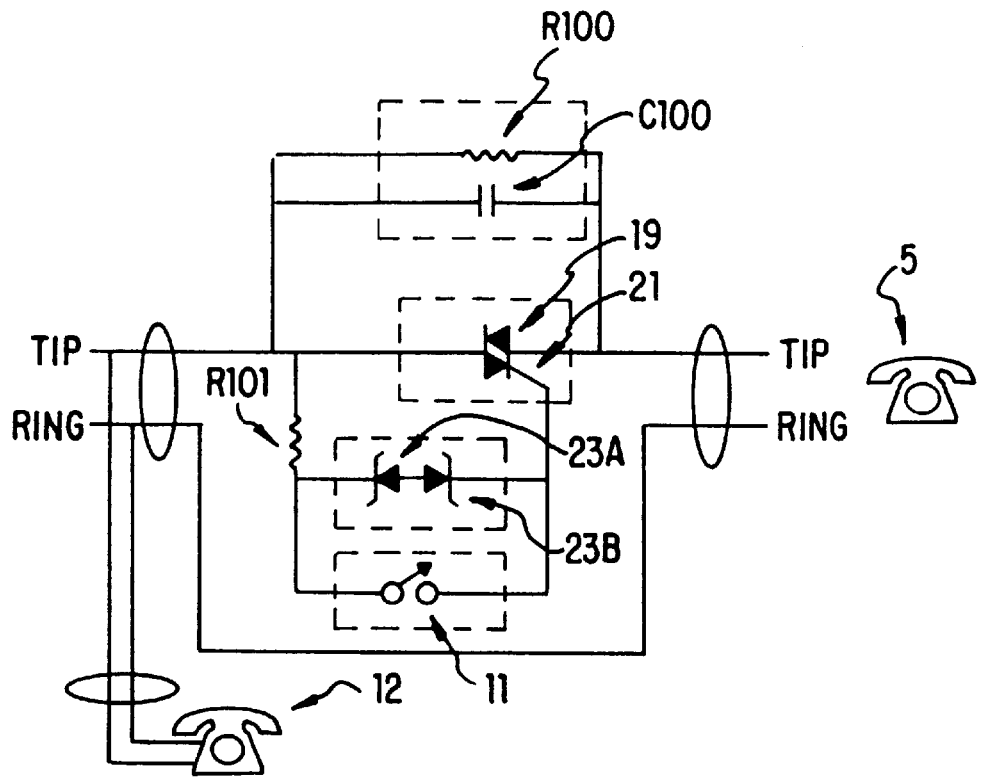
FIG. 4 is a circuit diagram of the apparatus of FIG. 1 connected within the telephone system of FIG. 3.

Referring to FIG. 4, the by-pass 13 may consist of a resistor R100 and a capacitor C100 in parallel to allow the passage of frequency shift keyed (FSK) message signals. These signals in many calling areas work from frequencies of approximately 1.2 KHz and 2.2 KHz. The impedance of R100 and C100 must be sufficiently high to appear to be a substantially open circuit when compared with the low input impedance, typically around 600 ohms, of the telephone 5 for communications intended to be heard over the telephone 5 by a user, while sufficiently low enough to appear to be a substantially open circuit when compared to the relatively high input impedance of typically over 1 mega-ohm for that part of a telephone device 5, such as call display, that is driven by FSK signals not intended to be heard by a user. Working by-passes meeting these requirements have used R100 at 100 K-ohms and C100 at 10 nano-farads to 100 nano-farads to allow 1–3 KHz signals to pass, however other values may be required or acceptable depending on the specifications of particular telephone networks and telephone devices. The entire range of frequencies could be allowed to pass provided the impedance of the by-pass meets the above criteria, however filtering of the frequencies to the above range provides some protection from undesired signals from reaching the telephone 5. The by-pass may also be for other future signals that employ other systems than FSK and will require consequent modification, however the principle of allowing desired signals through to the telephone 5 whether or not other extensions are on or off-hook and the telephone 5 is on or off-hook will continue to apply.

The controller 15 may be a triac 19, a bidirectional silicon controlled rectifier also known as a thyristor. The triac 19 will connect the Tip side from the telephone line to the telephone 5 when a current is received at its control input 21.

The detector 17 may be a pair of back to back zener diodes 23A, 23B, or one diac, not shown, connected between the Tip side of the incoming line and the control input 21 to the controller 15. The diodes 23 detect if another extension is off-hook, for example that connected to telephone 12, as the drop in voltage on the Tip side will not allow the diodes 23 to pass current. This prevents the triac 19 from turning on and connecting the Tip side of the telephone line to the telephone 5. If the other extension is on-hook, the voltage on the Tip side of the telephone line will be sufficiently high to cause current to flow in the diodes 23 when the telephone 5 goes off-hook. This will turn on the triac 19 and connect the Tip side of the telephone line to the telephone 5.

The switch 11 is a momentary switch 11 that may be used by the user to allow current to flow to and turn on the triac 19, even when another extension, such as that connected to telephone 12, is off-hook. The other extension must be off-hook so that current will immediately flow through the triac 19 and keep it turned on after the switch 11 returns to the open position. Switch 11 allows conferencing with the other extension when a call is in progress.

As the switch 11 is a momentary switch, upon the return of telephone 5 to an on-hook position, the triac 19 will automatically return to an open circuit state awaiting control signals from the detector 17 or the switch 11, i.e. the apparatus 1 is in the exclusion mode. In this way the switch 11 and the exclusion controller 15, eg. the triac 19, together act as a user operable control for connecting the line to the telephone 5. The control automatically does not connect the line to the telephone 5 when the telephone 5 returns to on-hook.

The automatic return to the exclusion mode means that the user does not have to remember at the end of a call that the apparatus 1 is not in exclusion mode. An alternate apparatus, not shown, could be configured using a typical on-off switch that simply connects the Tip side from the telephone line to the telephone 5 when the switch is turned on and does not return to exclusion mode until the switch is turned off. Although this apparatus would solve many of the problems currently known, the user would have to remember to turn the switch off at the end of a call or risk interrupting the next call. For this reason, the apparatus 1 is preferred.

It is also possible to create an apparatus, not shown, that has an exclusion controller that is normally in a non-exclusion mode, and has a detector that checks the voltage at the telephone line and must signal the exclusion controller when the telephone 5 goes off-hook not to connect the Tip side from the telephone line to the telephone 5 if another extension is off-hook. The difference is a matter of choice by the designer, the principle of having an exclusion controller to exclude calls to an extension when another extension is off-hook and having a switch to connect calls when another extension is in use remains the same.

An apparatus, not shown, could also be made that does not detect if an extension is off-hook when the telephone 5 goes off-hook. Rather it always excludes the telephone 5 and requires the user to manually connect the line using the switch 11. This could be appropriate for areas where the voltage setting, or fluctuation of the setting, from the telephone network, or the load on the network, make it difficult to create a detector that is accurate to a sufficiently high percentage of the time for the desired use.

R101 is simply a protection resistor forming part of the detector 17 and the switch 11 to limit current flow. A value of 1 K-ohms has been acceptable, however this may require modification depending on the impedance of the other components and the specifications of the telephone network.

Figure 5:
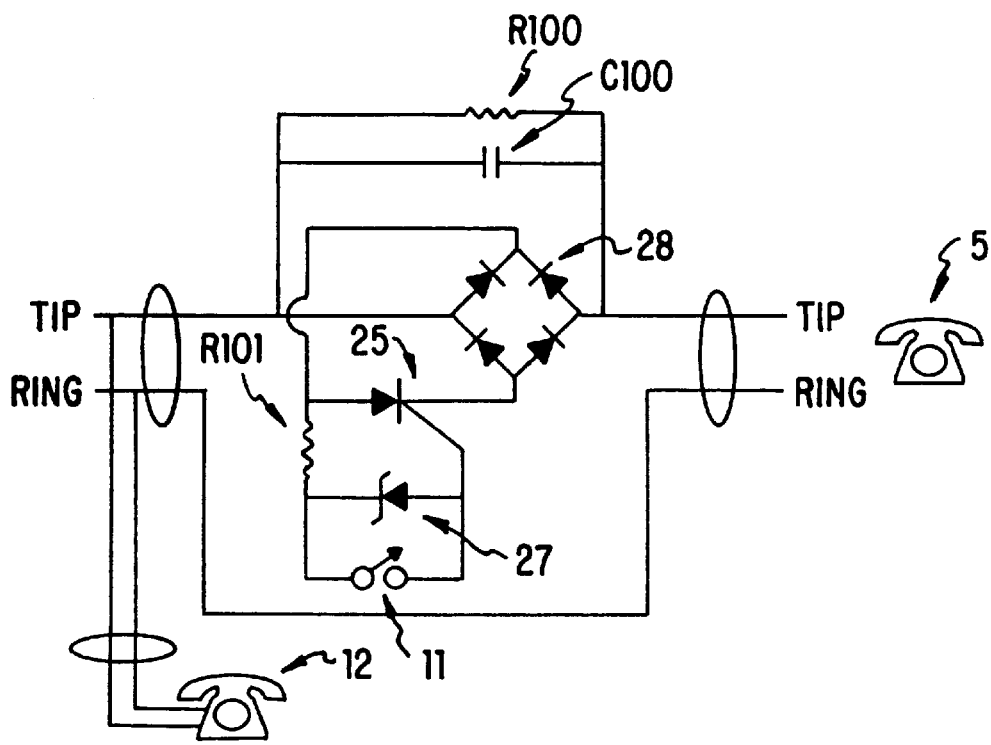
FIG. 5 is a circuit diagram of an extension-in-use apparatus according to an alternate embodiment of the invention employing single polarity components.

As noted previously, the exclusion apparatus 1 is polarity insensitive, i.e. Tip and Ring are reversible. It is also symmetrical, i.e. the incoming telephone line and the telephone 5 could be reversed. This polarity insensitivity and symmetry are a result of using polarity insensitive triac 19 within the controller 15 and zener diodes 23 detector 17. Referring to FIG. 5, the same effect could be accomplished by using polarity sensitive silicon controlled rectifier 25 in the controller 15 and a single zener diode 27 in the detector 17, and adding a bridge rectification block 28. All other components would be the same, except possibly for minor adjustments to the values of resistors and capacitors to compensate for changes in the circuit.

It will be understood by those skilled in the art that this description is made with reference to the preferred embodiment and that it is possible to make other embodiments employing the principles of the invention which fall within its spirit and scope as defined by the following claims.

We claim:

1. An extension-in-use exclusion apparatus for use in a telephone system having a telephone device, a telephone line and a plurality of telephone extensions connected to the telephone line, the apparatus comprising:

an exclusion controller operationally connected between the telephone line and only a first extension of the plurality of telephone extensions, for connecting the telephone line to the telephone device when the telephone device is off-hook and all extensions of the plurality of extensions other than the first extension are on-hook, and for preventing the connection of the telephone line to the telephone device when the telephone device goes off-hook and at least one of the plurality of telephone extensions other than the first extension is off-hook;

a user operable control for connecting the telephone line to the telephone device upon closing of the user operable control by a user when an extension other than the first extension is off-hook and the first extension is off-hook, and for maintaining the connection of the telephone line to the telephone device, thereby permitting both the first extension that is off-hook and the extension other than the first extension that is off-hook to be concurrently connected to the telephone line; and means for automatically resetting said user operable control when the first extension goes on-hook after user operation of the user operable control such that said exclusion controller again operates for preventing the connection of the telephone line to the telephone device.

2. The apparatus of claim 1, further comprising a detector for detecting if an extension is on-hook or off-hook and instructing the exclusion controller of the detected result.

3. The apparatus of claim 2, further comprising a by-pass connecting the telephone line to the telephone device for the passage of desired signals from the telephone line to the telephone device whether or not an extension other than the first extension and the telephone device are on-hook or off-hook.

4. The apparatus of claim 3, wherein the impedance of the by-pass is substantially greater than the input impedance of the telephone device for communications intended to be heard directly by the user, and substantially lower than the input impedance of the telephone device for communications intended to drive communications other than those intended to be heard directly by the user.

5. The apparatus of claim 4, wherein the by-pass is for frequency shift keyed signals.

6. The apparatus of claim 5, wherein the by-pass comprises a parallel connected resistor of approximately 100 K-ohms and a capacitor selected from the range consisting of approximately 10 to 100 nano-farads.

7. The apparatus of claim 1, wherein the apparatus is powered from the telephone line.

8. The apparatus of claim 1, wherein the apparatus is insensitive to the polarity of the line.

9. The apparatus of claim 8, wherein the apparatus is symmetrical for interchanging its connections to the line and the telephone device without affecting the operation of the apparatus.

10. The apparatus of claim 1, wherein the exclusion controller comprises at least a control input; and wherein the user operable control comprises a momentary switch for signalling the control input to connect the telephone line to the telephone device.

11. The apparatus of claim 10, wherein the exclusion controller further comprises a silicon controlled rectifier having two inputs, the first of the two silicon controlled rectifier inputs being the control input and the second of the two silicon controlled rectifier inputs for connecting the telephone line to the telephone device when the control input receives a current.

12. An extension-in-use exclusion apparatus for use in a telephone system having a telephone device, a telephone line having two sides and a plurality of telephone extensions connected to the telephone line, the apparatus comprising:

a triac connected between a first side of the telephone line and the telephone device, and having a control input for receiving signals;

a detector for determining when all extensions of the plurality of telephone extensions other than the first extension are on-hook and when at least one extension of the plurality of telephone extensions other than the first extension is off-hook, and for signalling the control input of the triac in response to a determination by the detector that the at least one extension of the plurality of telephone extensions other than the first extension is off-hook; and a user operable bypass for signalling the control input of the triac to connect the first side of the telephone line to the telephone device when the telephone device goes off-hook wherein the triac connects the first side of the telephone line to the telephone device when the telephone device is off-hook and the control input of the triac receives a signal from the user operable bypass indicating that the triac is to be connected to the first side of the telephone line, thereby permitting both the first extension that is off-hook and the extension other than the first extension that is off-hook to be concurrently connected to the telephone line; the triac maintains the connection of the telephone line to the telephone device notwithstanding the termination of the signal from the user operable bypass; the triac prevents the connection of the first side of the telephone line to the telephone device when the telephone device goes off-hook, at least one of the plurality of telephone extensions other than the first extension is off-hook and the control input of the triac has not received a signal from the user operable bypass indicating that the triac is to be connected to the first side of the telephone line; and the triac automatically resets to prevent the connection of the telephone line to the telephone device when the first extension goes on-hook after termination of the signal from the user operable bypass.

13. The apparatus of claim 12, wherein the detector comprises a pair of back to back zener diodes for connection to the first side of the line, and connected to the control input.

14. The apparatus of claim 13, wherein the by-pass control comprises a momentary switch for connection to the first side of the line, and connected to the control input.

15. The apparatus of claim 12, wherein the by-pass control comprises a momentary switch for connection to the first side of the line, and connected to the control input.

16. The apparatus of claim 12, wherein a resistor and capacitor are connected in parallel across the triac for allowing the passage of desired signals from the line to the telephone device whether or not an extension and the telephone device are on-hook or off-hook.

17. The apparatus of claim 12, further comprising a protection resistor for the diodes and the by-pass control.

18. The apparatus of claim 12, wherein the apparatus is powered from the telephone line.

19. A telephone system comprising:

a telephone device;

a telephone line;

a plurality of telephone extensions connected to the telephone line with the telephone device connected to one of the plurality of telephone extensions; and an extension-in-use exclusion apparatus comprising:

an exclusion controller operationally connected between the telephone line and only a first extension of the plurality of telephone extensions, for connecting the telephone line to the telephone device when the telephone device is off-hook and all extensions of the plurality of extensions other than the first extension are on-hook, and for preventing the connection of the telephone line to the telephone device when the telephone device goes off-hook and at least one of the plurality of telephone extensions other than the first extension is off-hook;

a user operable control for connecting the telephone line to the telephone device upon closing of the user operable control by a user for preventing the connection of the telephone line to the telephone device when an extension other than the first extension is off-hook and the first extension is off-hook, and for maintaining the connection of the telephone line to the telephone device, thereby permitting both the first extension that is off-hook and the extension other than the first extension that is off-hook to be concurrently connected to the telephone line; and means for automatically resetting said user operable control when the first extension is on-hook after user operation of the user operable control such that said exclusion controller again operates for preventing the connection of the telephone line to the telephone device.

20. A method of excluding a telephone device in a telephone system having a telephone line, a plurality of telephone extensions connected to the telephone line, and a telephone device capable of being connected to a first extension of the plurality of extensions, the method comprising the steps of:

connecting the telephone line to the telephone device when the telephone device is off-hook and all extensions of the plurality of extensions other than the first extension are on-hook;

preventing the connection of the telephone line to the telephone device when the telephone device goes off-hook and at least one of the plurality of telephone extensions other than the first extension is off-hook;

connecting the telephone line to the telephone device in response to user operation of a user operable control, operationally connected between the telephone line and only the first extension of the plurality of telephone extensions, for connecting the telephone line to the telephone device whereby both the first extension that is off-hook and the at least one of the plurality of extensions other than the first extension that is off-hook are concurrently connected to the telephone line;

maintaining the concurrent connection of both the telephone line to the telephone device and the at least one of the plurality of extensions other than the first extension that is off-hook to the telephone line; and automatically resetting the user operable control when the first extension goes on-hook after termination of user operation of the user operable control which is operationally connected between the telephone line and only the first extension of the plurality of telephone extensions thereby again preventing the connection of the telephone line to the telephone device when the telephone device is off-hook and at least one of the plurality of telephone extensions other than the first extension is off-hook.

* * * * *